Jan. 17, 1961 T. S. WANDVIK 2,968,325
TABLE SAW GAUGE FRAME
Filed Dec. 31, 1957 2 Sheets-Sheet 1

INVENTOR,
T. S. WANDVIK.
BY

INVENTOR,
T. S. WANDVIK.

United States Patent Office 2,968,325
Patented Jan. 17, 1961

2,968,325

TABLE SAW GAUGE FRAME

Theodore S. Wandvik, 3007 W. Broadway, Council Bluffs, Iowa

Filed Dec. 31, 1957, Ser. No. 706,503

3 Claims. (Cl. 143—169)

This invention relates to gauges for holding materials being cut on bench and table saws, and in particular a guide bar having a stop adjustably mounted thereon pivotally mounted on an arm adjustably mounted on a tongue slidable in a groove in a table top, and in which an indexing head is provided at the connection of the bar to the arm whereby the guide bar may be set at different angles in relation to a saw projecting through a slot in the table top and positioned normal to the arm.

The purpose of this invention is to provide a gauge for a table or bench saw with which a plurality of blocks or strips of wood or other material may be cut to the same size, or with parts thereof beveled to the same angle.

Various types of gauges and guides have been provided for table saws and the like, and whereas substantially any gauge holds materials in relation to a saw, such gauges are bolted to the table at various points, and for general use these connections require considerable time and are objectionable.

With this thought in mind this invention contemplates a gauge for table or bench saws in which there is an elongated tongue slidably mounted in a groove in the table top and all gauge and guide elements are suspended from or adjustably connected to this tongue.

The object of this invention is, therefore, to provide a gauge for bench and table saws that is readily set to different angles in relation to a saw extended through a slot in the table top in which the parts are self-supporting and bolts or screws for connecting the parts to the table top are not required.

Another object of the invention is to provide a gauge for table saws and the like in which a guide bar thereof is readily set to different angles.

Another important object of the invention is to provide a guide for holding materials in relation to the saw of a bench saw in which the device is readily positioned on and also readily removed from the bench saw top.

It is yet another object of the invention to provide a table or bench saw gauge in which stops are provided for positioning materials to be cut to eliminate the necessity of using a rule to measure each piece being cut.

A further object of the invention is to provide a table saw gauge in which lateral adjustment in relation to the saw of the table is provided whereby the gauge is designed for use with both narrow and wide boards.

A still further object of the invention is to provide a table and bench saw gauge having an adjustable guide for holding material in position for sawing in which the gauge is of a simple and economical construction.

With these and other objects and advantages in view the invention embodies an arm adjustably mounted on an elongated tongue with a guide bar pivotally mounted on the arm and provided with an indexing head for setting the guide bar at different angles, and with stop means on the bar for holding a plurality of pieces of material the same distance from the saw of a table or bench saw or the like.

Other features and advantages of the invention will appear from the following description taken in connection with the drawings, wherein.

Figure 1:
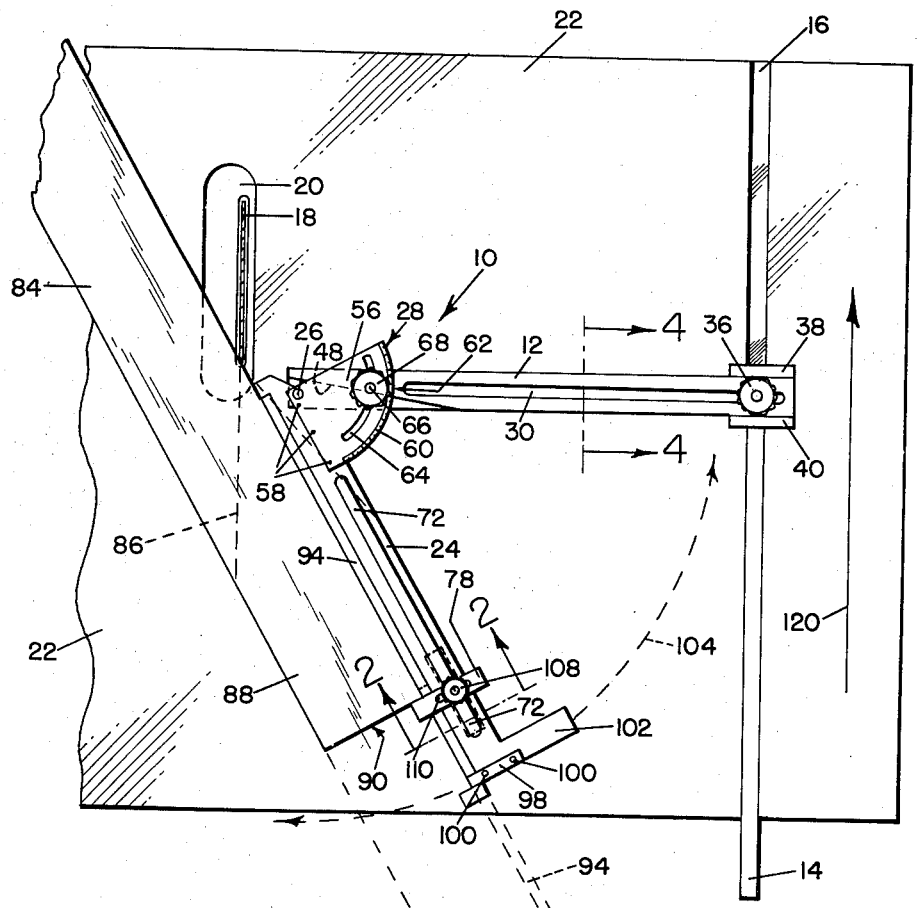
Figure 1 is a plan view of a table saw top showing the improved gauge of this invention thereon and with the gauge in the position of holding a strip of material at an acute angle in relation to a saw.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating an arm adjustably mounted on a tongue 14 slidable in a groove 16, which is parallel to a saw 18 in a slot 20 in a table top 22, and numeral 24 a guide bar pivotally mounted by a stud 26 on the end of the arm 12 and provided with an indexing head 28 by which the guide bar is set to different angles in relation to the arm and saw.

The arm 12 is provided with an elongated slot 30 through which a stud 32 carried by the tongue 14 extends, and the stud is provided with a nut having a scalloped edge to facilitate gripping by hand whereby the arm is clamped to the tongue. A washer 34 of sufficient diameter to extend across the slot 30 is positioned between the base of the nut, which is indicated by the numeral 36, and the surface of the arm 12. The tongue 14 is provided with guide blocks 38 and 40 between which the arm 12 is free to slide with the nut 36 released. The guide blocks support the arm normal to the tongue.

Figure 3:
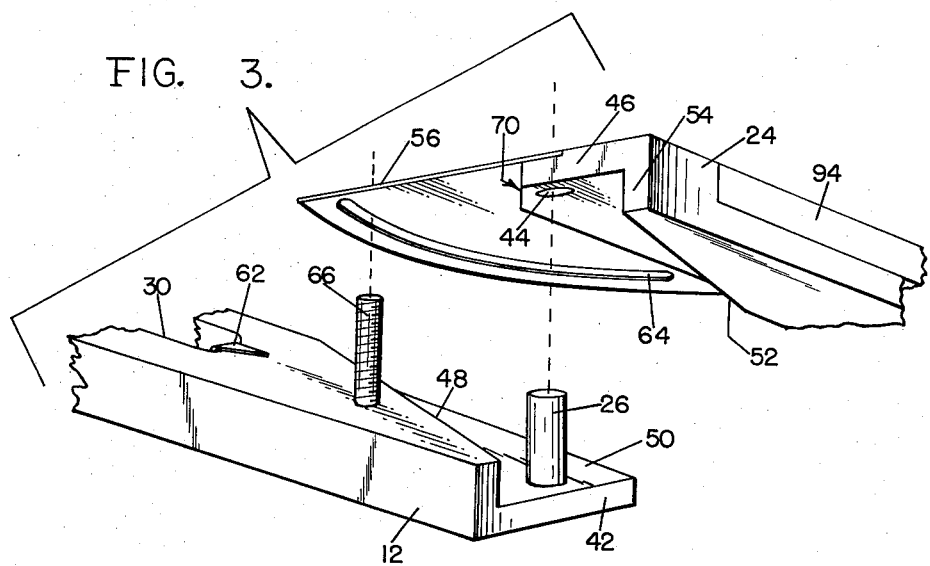
Figure 3 is an exploded view illustrating the connection between the guide bar and arm of the gauge.
Figure 4:
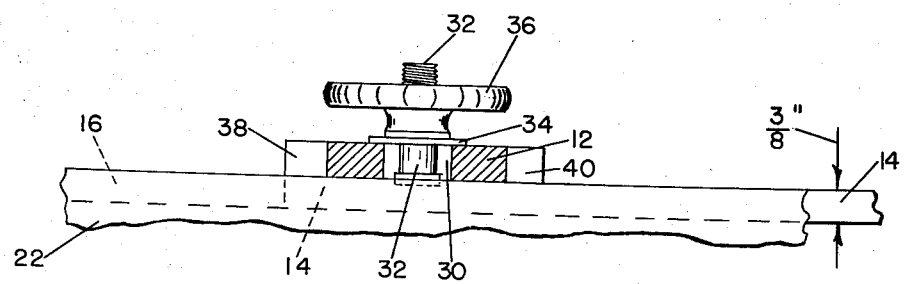
Figure 4 is a cross section through the arm of the gauge taken on line 4—4 of Figure 1, with the parts shown on an enlarged scale and showing the clamping means for securing the arm to a tongue positioned in a slot in the table top.

The end of the arm 12 opposite to the end mounted on the tongue 14 is L-shaped in cross section, as shown in Figure 3, and the stud 26 extends upwardly from the horizontal portion 42. The stud extends through an opening 44 in a horizontal portion 46 of an L-shaped inner end of the guide bar 24, and the arm is provided with a beveled surface 48 that forms a recess 50 in which the portion 46 of the guide bar is positioned with the parts assembled. The guide bar is provided with a similar beveled portion 52 forming a vertical leg 54 that overlaps the horizontal portion 42 of the arm.

The indexing head is provided by a plate 56 secured to the guide bar 24 by fasteners, such as the screws 58, and the peripheral edge of the plate, which is described about the center of the stud 26, is provided with graduations 60, which coact with a point 62 on the arm 12 to designate the angular relation of the guide bar to the arm. By this means the guide bar may be set to any desired angle in relation to the arm and saw. The plate 56 is provided with an arcuate slot 64, also described from the center of the stud 26, and the slot is positioned to receive a stud 66 which extends from the arm 12, and which is provided with a scalloped nut 68 by which the guide bar is clamped in angular positions in relation to the arm. The corner 70 of the guide bar is beveled to permit the corner to clear the beveled surface 48 of the arm 12 when the guide bar is positioned at a right angle in relation to the arm 12.

Figure 2:
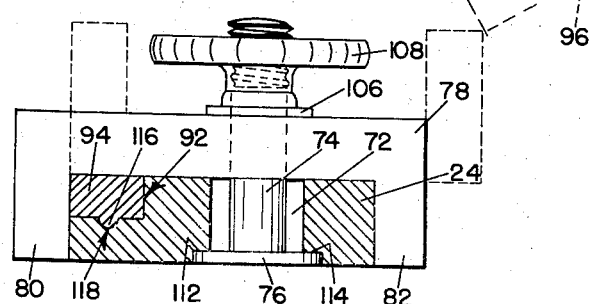
Figure 2 is a cross section through the guide bar of the gauge taken on line 2—2 of Figure 1 with the parts shown on an enlarged scale.

The guide bar 24 is provided with an elongated slot 72 through which a stud 74 having a head 76 extends and, as shown in Figure 2, the stud 74 extends through the back of an inverted U-shaped clamp 78, arms 80 and 82 of which extend over the sides of the guide bar. The distance of the clamp 78 from the saw may be adjusted in accordance with the length of material being cut by the saw so that strips of material 84 may be cut on the dotted line 86 to form a plurality of blocks 88 of the same size, the clamp 78 providing a stop and being positioned to be engaged by an end 90 of the strip of material. One corner of the guide bar 24 is provided with a recess 92 in which an extension rail 94 is positioned, and the end of the rail 94 is provided with a projection 96 whereby with the rail extended, as indicated by the dotted lines in Figure 1, long strips of material may be cut by the saw.

The extended end of the guide bar 24 is provided with a small bar 98 that is secured to the guide bar by screws 100, and, as shown in Figure 1, the bar 98 extends to the outer edge of the guide bar for retaining and clamping the rail 94 in the recess 92. The rail 94 is also held in adjusted positions by the U-shaped clamp 78. The extended end of the guide bar is also provided with an extension 102 which is positioned to engage the arm 12 when the guide bar is pivoted in the direction of the arrow 104 thereby preventing the fingers of the hand of the operator striking the arm.

A washer 106 is positioned on the stud 74 between the nut 108, the peripheral edge of which is scalloped to facilitate gripping by hand, and the back of the clamp 78, and, as shown in Figure 1, the back of the clamp is provided with a slot 110 through which the stud extends. The edges of the side portions of the guide bar 24 are provided with recesses 112 and 114 in which edges of the head 76 of the stud 74 are positioned, and the lower surface of the rail 94 is provided with a tongue 116 that is positioned to slide in a groove 118 in the guide bar.

*Operation*

With the parts assembled as illustrated and described the tongue 14 is placed in the groove 16 in the table top and with the arm 12 extended to a position adjacent the saw the guide bar 24 is set to an angle to which it is desired to cut a strip of material and by sliding the gauge forwardly in the direction of the arrow 120 the saw cuts through the strip of material. The gauge is then drawn rearwardly and the strip of material moved to engage the clamp 78, whereby the cycle of operations is repeated. By this means any desired number of strips or blocks may be cut to the same angle, and also to the same length. The length of the blocks is determined by adjusting the position of the clamp 78, and when long strips are desired the clamp is adjusted to an inverted position on top of the guide bar as shown in broken lines in Figure 2 and the rail is extended, as indicated by the dotted lines in Figure 1 whereby the end surface of the clamp is adjacent the working edge of the guide bar 24 and vertically flush with respect thereto. It will be noted that the clamp 78, when in the position shown in broken lines in Figure 2, does not interfere with positioning of the work piece along the working edge of the guide bar 24 when the rail 94 is in an extended position for use. When it is desired to cut wide boards the arm 12 is moved toward the tongue 14, and the angle and position of the stop are adjusted accordingly.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts, such as come within the purview of the invention claimed may be resorted to in actual practice, if desired.

Having now described the invention that which is claimed to be new and desired to be procured by Letters Patent, is:

1. In a table saw gauge the combination which comprises a saw table having a saw extended through a slot therein and also having a groove parallel to the saw in the upper surface, an elongated tongue slidable in the groove, a stud having a nut on the upper end extended from the tongue, an elongated arm having a longitudinally disposed slot therein positioned on the tongue with the stud extended through the slot of the arm, means for retaining the arm normal to the tongue, an elongated guide bar having a longitudinally disposed slot therein pivotally mounted on the extended end of the arm, a graduated indexing head mounted on the guide bar and positioned whereby graduations thereof are in registering relation with a point on the arm providing means for setting the guide bar at desired angles in relation to the arm, a stud extended from the arm through an arcuate slot in the indexing head, said slot of the indexing head being on a radius from the center of the pivotal mounting of the guide bar, a clamp having a stud therein slidably mounted on the guide bar and positioned with the stud extended through the longitudinally disposed slot thereof, an extension rail slidably mounted in the guide bar, and an extension projecting from the guide bar and positioned to engage the arm in a movement of the guide bar toward the arm.

2. In a table saw, the combination which comprises a saw table top having a longitudinally disposed slot extended therethrough, said table top also having a groove extended longitudinally therethrough and positioned in the upper surface, said groove being spaced from and parallel to the slot, a tongue slidably mounted in said groove, spaced parallel blocks mounted on the tongue and positioned normal thereto, an arm having an elongated slot therein also positioned normal to the tongue and mounted to slide between said blocks, a stud extended from the tongue through the the slot of the arm and having a lock nut thereon, a saw mounted in the table and extended upwardly through the slot thereof, a guide bar also having an elongated slot therein pivotally mounted on the extended end of the arm, means for securing the guide bar in adjusted angular positions in relation to the arm, said guide bar having a longitudinally disposed recess in one edge, an extension rail having a stop on an end extended from the guide bar, slidably mounted in said recess, a U-shaped clamp having a stud with a lock nut thereon extended therethrough positioned over the guide bar and extension rail, and means for slidably mounting the stud with the lock nut thereon on the guide bar.

3. In a table saw, the combination which comprises a saw table top having a longitudinally disposed slot extended therethrough, said table top also having a groove extended longitudinally therethrough and positioned in the upper surface, said groove being spaced from and parallel to the slot, a tongue slidably mounted in said groove, spaced parallel blocks mounted on the tongue and positioned transversely thereof, an arm having elongated slot therein also positioned transversely of the tongue and mounted to slide between said blocks, a stud extended from the tongue through the slot of the arm and having a lock nut thereon, a saw mounted in the table and extended through the slot in the table top, a guide bar also having an elongated slot therein pivotally mounted on the extended end of the arm, an indexing head mounted on the guide bar and having an arcuate slot therein, the arcuate slot being positioned on a radius centered on the axis of the pivotal mounting of the guide bar on the arm, a stud having a thumb nut thereon extended from the arm through the slot for retaining the guide bar in adjusted angular positions in relation to the arm, said guide bar having a longitudinally disposed recess in one edge, an extension rail having a stop on the end extended from the guide bar slidably mounted in said recess, a U-shaped clamp having a stud with a lock nut thereon positioned over the guide bar and extension rail, a small bar on the guide bar extended over the extension rail for clamping the rail in adjusted positions on the guide bar whereby work is positioned in relation to the saw so that work is cut to uniform lengths, the U-shaped clamp being arranged to be turned to an inverted position when work is positioned by the extension rail, and means extended from the guide bar for preventing the guide bar engaging said arm.

References Cited in the file of this patent

UNITED STATES PATENTS

| Number | Name | Date |
|---|---|---|
| 141,975 | Xander | Aug. 19, 1873 |
| 438,029 | Strahl | Oct. 7, 1890 |
| 701,724 | Hewitt | June 3, 1902 |
| 790,182 | Butterworth | May 16, 1905 |
| 1,789,125 | Wilderson | Jan. 13, 1931 |
| 2,010,882 | Ocenasek | Aug. 13, 1935 |
| 2,237,556 | Hedgpeth | Apr. 8, 1941 |
| 2,285,897 | Campbell | June 9, 1942 |
| 2,535,843 | Curtis | Dec. 26, 1950 |
| 2,563,169 | Hughes | Aug. 7, 1951 |
| 2,601,878 | Anderson | July 1, 1952 |
| 2,745,447 | Studley | May 15, 1956 |